US011959303B2

(12) United States Patent
Waxmundsky

(10) Patent No.: US 11,959,303 B2
(45) Date of Patent: Apr. 16, 2024

(54) INSULATED DOOR LOCK ASSEMBLY

(71) Applicant: Stanley Waxmundsky, Bloomsbury, NJ (US)

(72) Inventor: Stanley Waxmundsky, Bloomsbury, NJ (US)

( * ) Notice: Subject to any disclaimer, the term of this patent is extended or adjusted under 35 U.S.C. 154(b) by 305 days.

(21) Appl. No.: 17/499,729

(22) Filed: Oct. 12, 2021

(65) Prior Publication Data

US 2022/0162880 A1 May 26, 2022

Related U.S. Application Data

(60) Provisional application No. 63/118,564, filed on Nov. 25, 2020.

(51) Int. Cl.

| | |
|---|---|
| ***E05B 1/00*** | (2006.01) |
| ***E05B 13/00*** | (2006.01) |
| ***E05B 17/18*** | (2006.01) |

(52) U.S. Cl.

CPC .......... *E05B 1/0061* (2013.01); *E05B 13/001* (2013.01); *E05B 17/183* (2013.01); *E05B 1/0053* (2013.01); *Y10S 70/58* (2013.01); *Y10S 292/02* (2013.01)

(58) Field of Classification Search

CPC .... E05B 1/0061; E05B 13/001; E05B 17/183; E05B 17/14; E05B 1/0053; E05B 13/00; E05B 65/0014; Y10S 292/02; Y10S 70/58; Y10T 70/8649

See application file for complete search history.

(56) References Cited

U.S. PATENT DOCUMENTS

| | | | | | |
|---|---|---|---|---|---|
| 1,491,780 | A | * | 4/1924 | Abbott | E05B 1/0069<br>16/904 |
| 1,869,404 | A | * | 8/1932 | Boissonnault | E05B 45/06<br>70/427 |
| 1,917,973 | A | * | 7/1933 | Hughes | B60R 25/023<br>70/427 |
| 1,947,081 | A | * | 2/1934 | Grady | F16K 35/10<br>70/2 |
| 2,096,568 | A | * | 10/1937 | Snively | E05B 17/183<br>70/455 |
| 2,169,438 | A | * | 8/1939 | Sherman | E05B 13/001<br>70/211 |
| 2,458,002 | A | * | 1/1949 | Kaskouras | E05B 13/001<br>70/2 |

(Continued)

*Primary Examiner* — Christine M Mills
*Assistant Examiner* — Faria F Ahmad
(74) *Attorney, Agent, or Firm* — Barry Choobin; Patent 360

(57) ABSTRACT

An insulated door lock assembly including a base member with an aperture for the cylinder of a lock. The base member is configured to be mounted to a door around a hole for the door lock. The inner volume of the base member can be filled with an insulating material. A cover member can be coupled to the base member through a hinge joint. The cover member can be configured to switch between an open state and a closed state. A keyway or a thumb turn of the door lock can be accessible in the open state and the keyway or the thumb turn is covered by the cover member in the closed state. An O-ring can also be provided around a periphery of the base member for sealably engaging the cover member to the base member.

9 Claims, 6 Drawing Sheets

(56) References Cited

U.S. PATENT DOCUMENTS

| | | | | |
|---|---|---|---|---|
| 2,699,809 | A * | 1/1955 | Nebe | E05B 1/0061 16/DIG. 30 |
| 2,731,056 | A * | 1/1956 | Anson | A47G 23/03 D7/624.1 |
| 2,753,911 | A * | 7/1956 | Haslett | E05B 1/0061 16/86 A |
| 2,756,088 | A * | 7/1956 | Sutter | E05B 1/0053 74/557 |
| 2,883,850 | A * | 4/1959 | Falck | E05B 13/001 292/347 |
| 2,997,089 | A * | 8/1961 | Amdur | E05B 1/0061 118/505 |
| 3,082,028 | A * | 3/1963 | Werle | E05B 13/001 267/152 |
| 3,084,965 | A * | 4/1963 | Carosello | E05B 13/001 16/DIG. 30 |
| 3,152,716 | A * | 10/1964 | Feldhahn | A45C 13/1069 220/4.24 |
| 3,210,972 | A * | 10/1965 | Johnson | E05B 13/001 70/2 |
| 3,245,240 | A * | 4/1966 | De Forrest | E05B 13/001 70/2 |
| 3,340,709 | A * | 9/1967 | Callahan | E05B 13/001 70/2 |
| 3,343,578 | A * | 9/1967 | Rubin | E05B 1/0061 74/558.5 |
| 3,406,708 | A * | 10/1968 | Maydock | F16K 35/10 70/180 |
| 3,556,571 | A * | 1/1971 | Laub, Jr. | E05B 13/001 16/85 |
| 3,636,742 | A * | 1/1972 | Raney | A47G 29/10 70/424 |
| 3,660,996 | A * | 5/1972 | Syvertson | E05B 13/001 70/DIG. 58 |
| 3,725,892 | A * | 4/1973 | Faltico | G08B 13/06 200/61.93 |
| 3,748,882 | A * | 7/1973 | Dusault, Jr. | E05B 13/001 70/447 |
| 3,888,096 | A * | 6/1975 | Huss | E05B 13/001 70/416 |
| 4,007,956 | A * | 2/1977 | Harris | E05B 13/001 292/357 |
| 4,064,721 | A * | 12/1977 | Morgan | E05B 35/12 70/416 |
| 4,082,351 | A * | 4/1978 | Chrones | E05B 13/001 16/DIG. 30 |
| 4,181,339 | A * | 1/1980 | Rigsby | E05F 5/10 16/86 A |
| 4,226,104 | A * | 10/1980 | Oliver | E05B 13/001 70/423 |
| 4,285,221 | A * | 8/1981 | Atchisson | E05B 13/001 70/424 |
| 4,285,536 | A * | 8/1981 | McCoy | E05B 1/0053 292/336.3 |
| 4,397,489 | A * | 8/1983 | Lind | E05B 1/0053 292/336.3 |
| 4,481,797 | A * | 11/1984 | Milo | B65D 90/105 70/164 |
| 4,561,273 | A * | 12/1985 | Robinson | E05B 13/001 70/426 |
| 4,562,666 | A * | 1/1986 | Young, III | E05B 13/001 49/463 |
| 4,570,470 | A * | 2/1986 | Gray, Sr. | E05B 13/001 70/424 |
| 4,631,938 | A * | 12/1986 | Johnson | E05B 13/001 70/427 |
| 4,683,741 | A * | 8/1987 | Fields | E05B 17/10 70/432 |
| 4,858,454 | A * | 8/1989 | McAnulty, III | E05B 17/183 220/230 |
| 4,869,305 | A * | 9/1989 | Jones | E05B 13/001 D8/322 |
| 4,876,867 | A * | 10/1989 | Leneave | E05B 13/001 70/420 |
| 4,885,921 | A * | 12/1989 | Sharav | E05B 13/04 70/159 |
| 4,899,564 | A * | 2/1990 | Gilbert | E05B 13/001 70/424 |
| 4,913,479 | A * | 4/1990 | Allison | E05B 1/0053 292/347 |
| 4,914,554 | A * | 4/1990 | Sowers | E05B 17/106 362/100 |
| 5,008,551 | A * | 4/1991 | Randolph | F21K 2/00 250/462.1 |
| 5,179,325 | A * | 1/1993 | Aragon, Jr. | E05B 17/10 362/100 |
| 5,203,187 | A * | 4/1993 | Kane | E05B 13/001 70/424 |
| 5,205,144 | A * | 4/1993 | Montano | E05B 17/14 70/455 |
| 5,241,846 | A * | 9/1993 | Hoke | E05B 77/34 70/423 |
| 5,423,583 | A * | 6/1995 | Crockom | E05B 13/001 70/424 |
| 5,477,711 | A * | 12/1995 | Oliveri | E05B 13/001 70/369 |
| 5,560,235 | A * | 10/1996 | Aucoin | E05B 13/001 70/168 |
| 5,701,635 | A * | 12/1997 | Hawkes | E05C 17/52 16/86 A |
| 5,713,615 | A * | 2/1998 | Tsai | E05B 1/0061 292/347 |
| 5,758,529 | A * | 6/1998 | Chhatwal | E05B 15/02 70/423 |
| 6,122,945 | A * | 9/2000 | Grant | E05B 17/145 70/426 |
| H2137 | H * | 1/2006 | Newman | E05B 1/04 16/110.1 |
| 7,753,417 | B1 * | 7/2010 | Koughan | E05B 17/005 292/288 |
| 7,918,116 | B2 * | 4/2011 | Quach | E05B 13/002 292/288 |
| 10,151,122 | B2 * | 12/2018 | Marks | E05B 17/10 |
| 10,612,270 | B1 * | 4/2020 | Wu | E05B 17/183 |
| 10,676,267 | B2 * | 6/2020 | Seiders | B65D 81/3823 |
| 11,624,208 | B2 * | 4/2023 | Shumaker | E05B 13/108 70/432 |
| 2003/0070456 | A1 * | 4/2003 | Zamberg | E05B 13/001 70/208 |
| 2005/0034270 | A1 * | 2/2005 | Newman | E05B 1/04 16/110.1 |
| 2008/0296912 | A1 * | 12/2008 | Whitner | E05B 47/0012 292/144 |
| 2009/0229323 | A1 * | 9/2009 | Dykstra | E05B 13/001 292/341.14 |
| 2010/0326149 | A1 * | 12/2010 | Chang | E05B 35/004 70/423 |
| 2015/0048626 | A1 * | 2/2015 | Hogan | E05B 3/00 16/412 |
| 2016/0145895 | A1 * | 5/2016 | Kankkunen | E05B 15/02 70/432 |
| 2020/0248475 | A1 * | 8/2020 | Lunday | E05B 13/00 |
| 2021/0095495 | A1 * | 4/2021 | Wesley | E05D 11/1014 |

* cited by examiner

INSULATED DOOR LOCK ASSEMBLY

CROSS-REFERENCE TO RELATED APPLICATION

This application claims priority from a U.S. provisional patent application Ser. No. 63/118,564 filed on Nov. 25, 2020, which is incorporated herein by reference in its entirety.

FIELD OF INVENTION

The present invention relates to an insulated door lock assembly, and more particularly the present invention relates to an insulated door lock handle and cover that can be personalized.

BACKGROUND

In cold climates, buildings are generally insulated by using insulating materials in walls, doors, and windows. This prevents the loss of heat to the outside of the building and minimizes energy bills. The entrance doors in a building, such as a residential building are generally installed with deadbolt locks or any similar lock that requires a through-hole made in the door. Such locks still allow the cold from outside to seep into the building. In extremely cold climates, the amount of heat loss due to locks can be significant.

Thus, a desire is there for a door lock assembly that can prevent heat loss through the door locks. A desire is there for an insulated door lock assembly for residential buildings in cold climates.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an insulated door lock assembly for a building.

It is another object of the present invention that the insulated door lock assembly can be personalized.

It is still another object of the present invention that the insulated door lock assembly is economical to manufacture.

It is yet another object of the present invention that the insulated door lock assembly can retrofit existing door locks.

It is an additional object of the present invention that the insulated door lock assembly does not affect the strength of the door locks.

It is still an additional object of the present invention that the insulated door lock assembly has an aesthetic appearance.

In one aspect, disclosed is an insulated door lock assembly including a base member with an aperture for the cylinder of a lock. The base member is configured to be mounted to a door around a hole for the door lock. The inner volume of the base member can be filled with an insulating material. A cover member can be coupled to the base member through a hinge joint. The cover member can be configured to switch between an open state and a closed state. A keyway or a thumb turn of the door lock can be accessible in the open state and the keyway or the thumb turn is covered by the cover member in the closed state. An O-ring can also be provided around a periphery of the base member for sealably engaging the cover member to the base member.

In one aspect, the cover member has an outer face and an inner face, each the outer face and the inner face has a weatherproof Plexiglass. An indicium can be incorporated adjacent to the Plexiglass and visible through the Plexiglass. Additionally, the insulating material can be filled in a space between the two Plexiglasses or between the two indicia. Optionally, the Plexiglass on the front face can be fixed and weathertight, while the Plexiglass on the inner face can be removed. A retaining ring and/or spacer can keep the inner Plexiglass in a fixed position.

In one aspect, disclosed is an insulated door lock assembly having a base member with an aperture for the cylinder of a lock. The base member is configured to be mounted to a door around the hole for the door lock or to the door lock. An intermediate member can be rotatably coupled to the base member, wherein the intermediate member can be insulative and encase the handle of the door, wherein the intermediate member can be grasped for turning the handle. A cover member can be sealably and pivotally coupled to the intermediate member through a hinge joint, wherein the cover member can be configured to switch between an open state and a closed state. A keyway or thumb turn of the door lock can be accessible in the open state and the keyway or the thumb turn can be covered by the cover member in the closed position.

In one aspect, the intermediate member can encase a flush thumb, thumb turn, or a knob handle of the door. In one case, the intermediate member can encase lever-type door handles.

In one aspect, the disclosed insulated door lock assembly may further include a light source and a battery, and a trigger to turn the light source on and off, wherein the trigger can be configured in the cover member, wherein lifting the cover member turns on the power supply to the light source and closing of the cover member cuts off the power supply. The light source can be positioned in the base member or the intermediate member to illuminate the keyhole. The battery can be replaced by a solar panel or both can be used.

In one aspect, the cover member can be provided in a range of shapes and sizes for aesthetic purposes. Additionally, the cover member can be provided at an acute angle relative to the base member such as to increase the effective surface of the front face accommodating a large size photograph and a comfortable viewing angle. Additionally, the cover member can be interchangeably used to have a different aesthetic appearance.

In one aspect, the outer face of the cover member can also be provided with a solar cell unit for converting light to electrical energy, wherein the electrical energy can be used to recharge the battery or any other use.

In one aspect, the base member can be manufactured in two halves and the two halves can be joined by a fastening mechanism, such as a snap-fit mechanism, wherein two halves can have mating members that may interlock to join the two halves. The two halves can be joined around an already fitted escutcheon or cylinder of the door handle/lock. The hinge joint may allow the cover member to be removably coupled. To make it easier, the two halves can be joined at one end through a hinge joint.

In one aspect, both the base member and the intermediate member can be manufactured in two halves and the two halves can be joined by a fastening mechanism, such as the snap-fit mechanism, wherein two halves can have mating members that may interlock to join the two halves. The two halves of the intermediate member can be assembled around the handle, such as a doorknob or a lever.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word “exemplary” is used herein to mean “serving as an example, instance, or illustration.” Any embodiment described herein as “exemplary” is not necessarily to be construed as preferred or advantageous over other embodiments. Likewise, the term “embodiments of the present invention” does not require that all embodiments of the invention include the discussed feature, advantage, or mode of operation.

The terminology used herein is for the purpose of describing particular embodiments only and is not intended to be limiting of embodiments of the invention. As used herein, the singular forms “a”, “an”, and “the” are intended to include the plural forms as well, unless the context clearly indicates otherwise. It will be further understood that the terms “comprises”, “comprising,”, “includes” and/or “including”, when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Figure 1:
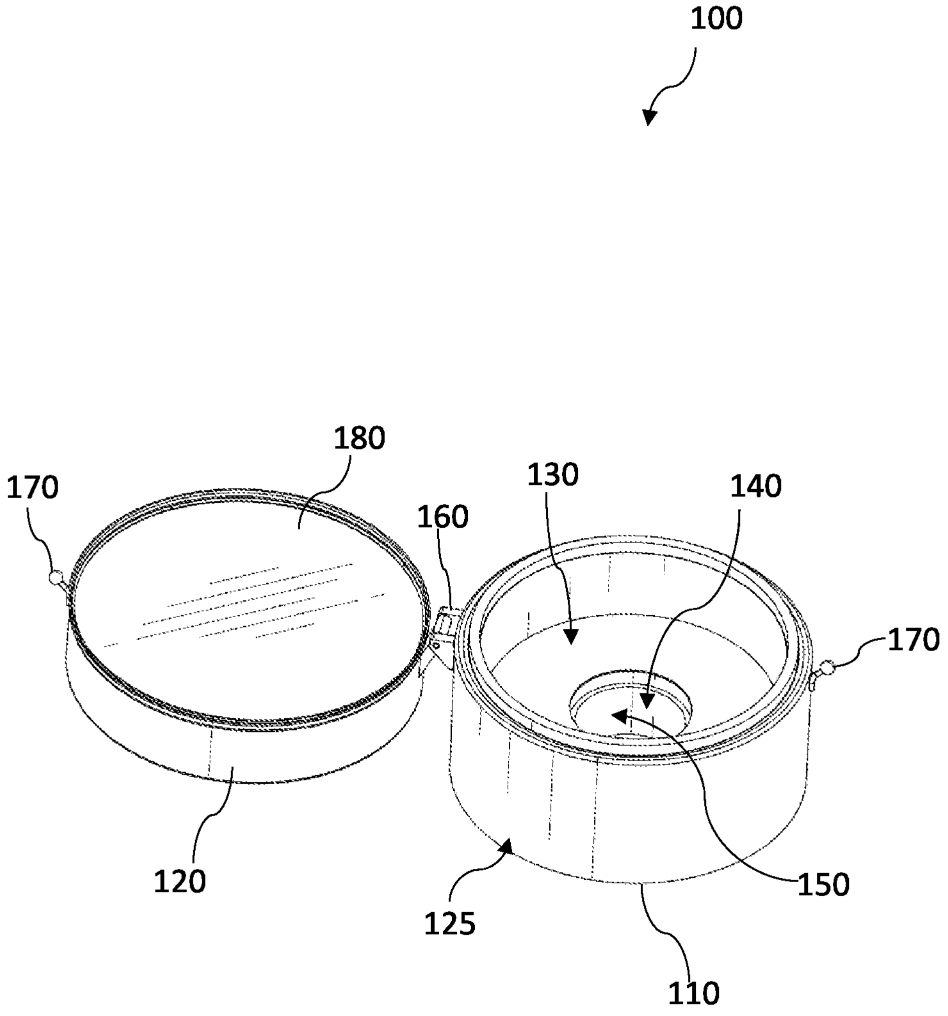
FIG. 1 is a perspective view of the disclosed insulated door lock assembly, according to an exemplary embodiment of the present invention.

Referring to FIG. 1 shows an exemplary embodiment of the disclosed insulated door lock assembly 100 having a base member 110 and a cover member 120. The base member 110 is shown having a cylindrical body including a faceplate 130 and wall 125 around a periphery of the faceplate 130 forming an inner volume of the base member 110. It is to be understood that FIG. 1 shows a cylindrical shape base member, however, any other shape of the base member is within the scope of the present invention. The shape of the base member and the cover member can be varied based on the design of the door lock as well as for aesthetic purposes. The base member 110 can be mounted to a door around a hole for the door lock. Generally, the base member can replace an existing escutcheon of the door lock. Alternatively, the base member can be applied over an existing escutcheon of the door lock. The base member can be coupled to the door or existing escutcheon through an adhesive or fasteners. The fasteners can be, for example, screws or magnetic plates.

The center of the faceplate 130 of the base member 110 can include an aperture 140 for the cylinder of the lock. The cylinder can be a part of the door handle, a thumb turn, or a keyway. An insulation member 150, such as Styrofoam, having an aperture concentric with the aperture 140 in the faceplate 130, can be inserted through the bottom of the base member 110. The insulation member can provide insulation against the seeping outdoor cold. The base member 110 can also have a hollow space defined by the faceplate 130 and wall 125. The hollow space can accommodate a keyway or a thumb turn of the lock. The faceplate 130 can divide an inner volume of the base member in front inner volume and a rear inner volume, the rear inner volume can receive an insulation pad and the front inner volume can encase the keyway or the thumb turn or a similar part of a door lock.

A cover member 120 can be pivotally coupled to the base member 110. A hinge joint 160 can be seen coupling the base member 110 to the cover member 120. The cover member 120 can pivot between an open state and a close state. FIG. 1 shows the insulated door lock assembly 100 in the open state. A handle 170 having two parts can be seen extending from the peripheries of the cover member 120 and the base member 110, wherein the handle 170 may allow lifting the cover member 120 away from the base member 110.

The cover member 120 can include an inner face (inner faceplate) and an outer face (outer faceplate). FIG. 1 shows the inner face 180 while the outer face can be opposite to the inner face. An indicium can be applied to the inner face and the outer face of the cover member 120. In one case, the inner face and the outer face can be formed by a Plexiglass wherein the indicia can be applied behind the Plexiglass and visible through the Plexiglass.

Figure 2:
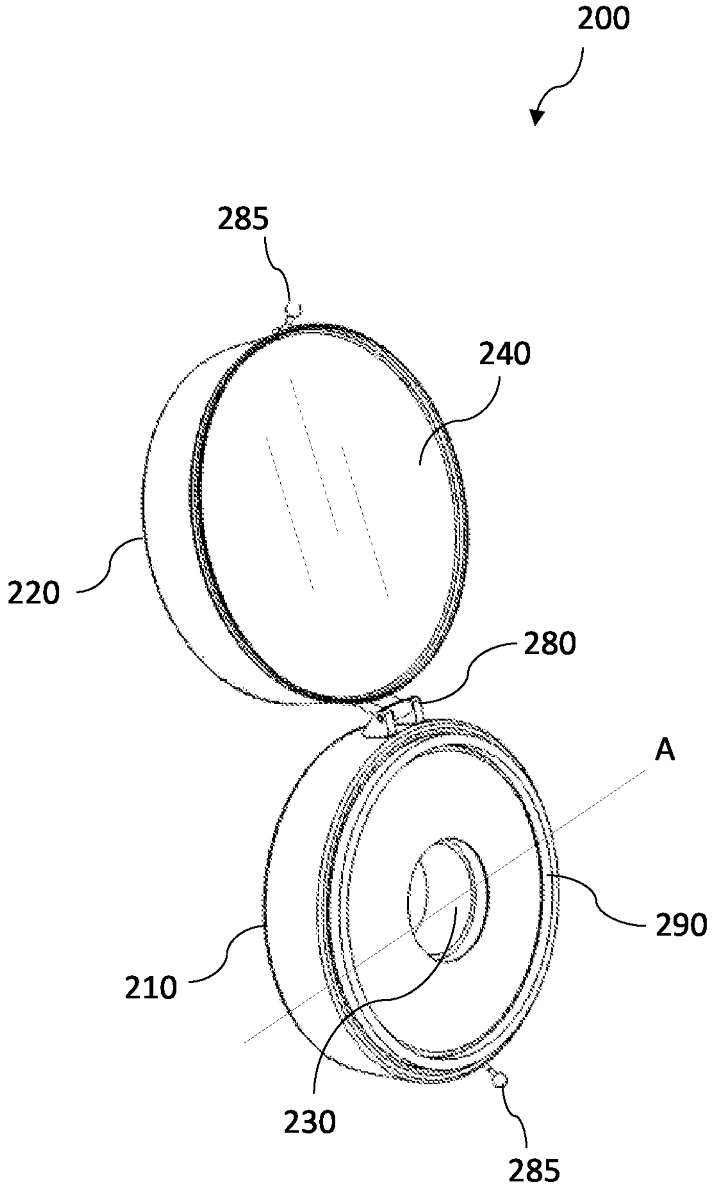
FIG. 2 is a perspective view of another disclosed insulated door lock assembly in an open state, according to an exemplary embodiment of the present invention.
Figure 3:
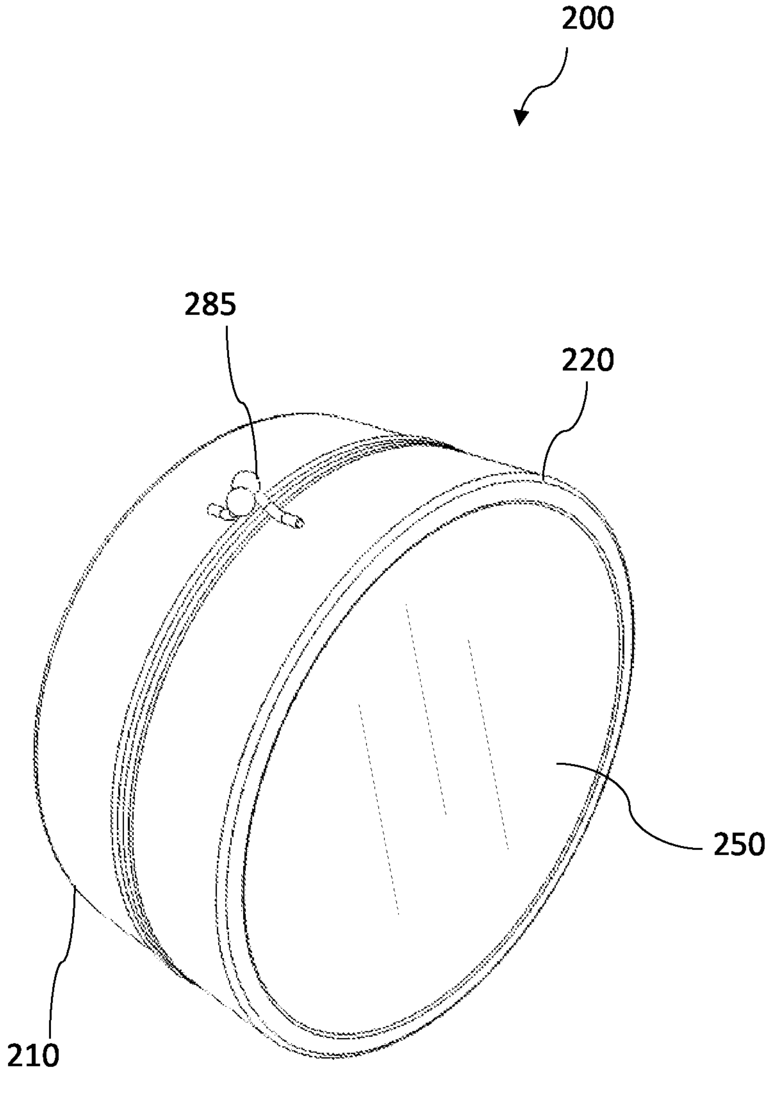
FIG. 3 shows the insulated door lock assembly of FIG. 2 in a closed state, according to an exemplary embodiment of the present invention.
Figure 4:
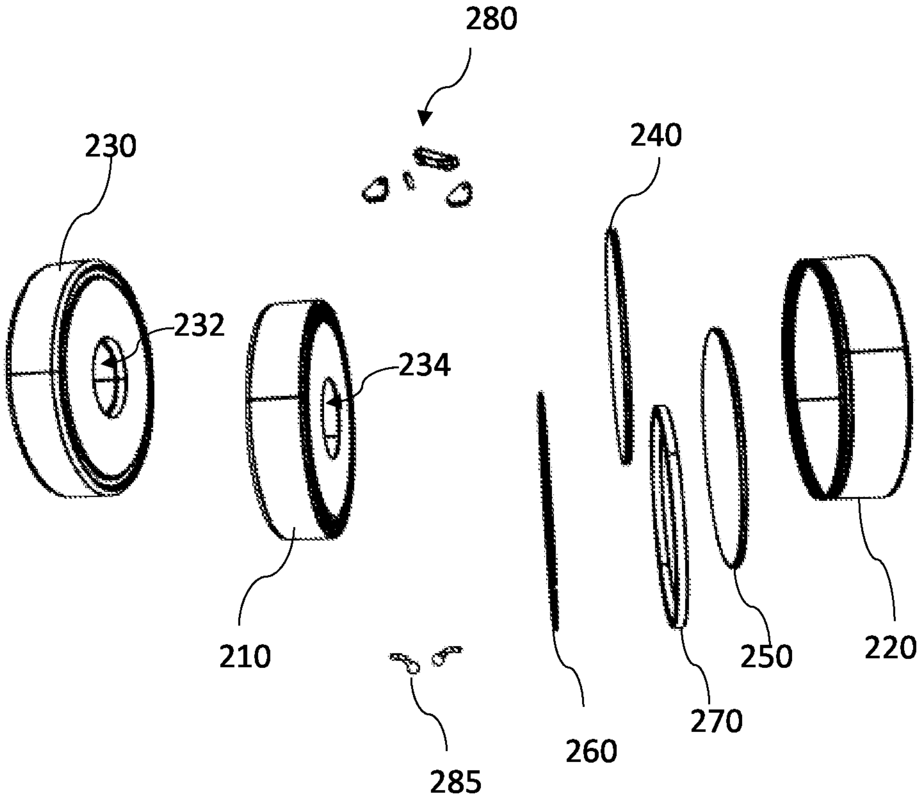
FIG. 4 is an exploded view of the insulated door lock assembly of FIG. 2, according to an exemplary embodiment of the present invention.

Referring to FIG. 2 which shows another exemplary embodiment of the disclosed insulated door lock assembly 200 having a base member 210 and a cover member 220. FIG. 2 shows the insulated door lock assembly 200 in an open state. FIG. 3 shows the same insulated door lock assembly 200 in a closed state wherein the cover member is interlocked to the base member. The base member can have a faceplate and wall around a periphery of the faceplate forming an inner volume of the base member 210. The base member 210 can be filled with insulation material 230. The insulation can prevent heat loss through the hole in the door and the inner parts of the door lock. The cover member 220 can insulate the keyway, thumb turn, or handle of the door lock. Also, referring to FIG. 4 shows an exploded view of the insulated door lock assembly 200. The insulation material 230 can be in a form of a cylindrical pad with an aperture 232 at the center which can be concentric with the aperture 234 in the faceplate of the base member 210. In one case, the cylindrical pad 230 can be inserted from the bottom of the base member 210.

A cover member 220 can be pivotally coupled to the base member 210. A hinge joint 280 can be seen coupling the base member 210 to the cover member 220. The cover member 220 can pivot between an open state and a close state. FIG. 2 shows the insulated door lock assembly 200 in the open state. A handle 285 having two parts can be seen extending from the periphery of the cover member 220 and the base member 210, wherein the handle 285 may allow lifting the cover member 220 away from the base member 210.

The cover member 220 can include an inner face (inner faceplate) and an outer face (outer faceplate). FIG. 2 shows the inner face while the outer face can be opposite to the inner face. An indicium can be applied to the inner face and the outer face of the cover member 220. In one case, the inner face and the outer face can be formed by a Plexiglass wherein the indicia can be applied behind the Plexiglass and visible through the Plexiglass. FIG. 2 shows the inner Plexiglass 240 and FIG. 3 shows the outer Plexiglass 250. Also referring to the exploded view shown in FIG. 4, the cover member can include the inner Plexiglass 240, outer Plexiglass 250, an O-ring 260, and a spacer 270. The outer Plexiglass 250 can be fixed in the base member 210, while the inner Plexiglass 240 can be removable. The inner Plexiglass 240 can be removed to apply an indicium to the outer Plexiglass 250 and the inner Plexiglass 240. The inner Plexiglass 240 can be stabilized using the spacer 270 and O-ring 260. The spacer 270 can be sandwiched between peripheries of the outer Plexiglass 250 and the inner Plexiglass 240. Additionally, the space between the outer Plexiglass 250 and the inner Plexiglass 240 can be filled with insulation material.

Figure 5:
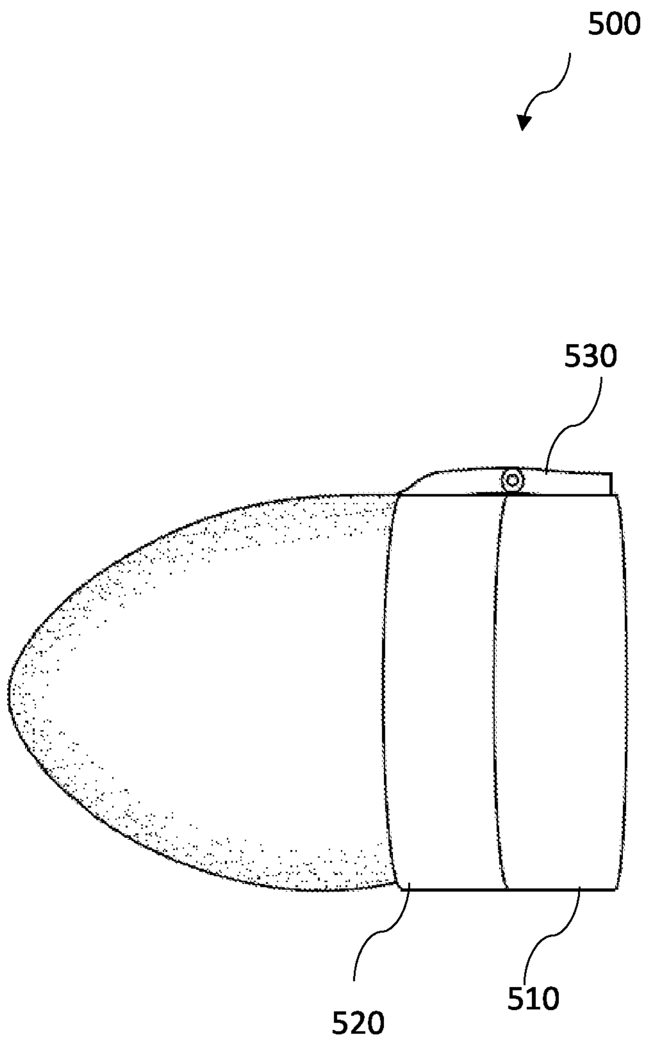
FIG. 5 shows the insulated door lock assembly of FIG. 2 with a different cover member resembling a half rugby ball, according to an exemplary embodiment of the present invention.

FIG. 2-4 also shows a hinge joint 280 that allows the cover member 220 to pivot relative to the base member 210. When installed, the cover member can be lifted to gain access to the keyway, thumb turn, or like part of a lock protruding from the aperture 234 in the base member 210. When closed, the cover member 220 can insulate the base member 210. In the closed state, an outer indicium can be visible through the outer Plexiglass 250. When lifted upwards, the inner indicium can be visible through the inner Plexiglass 240. The hinge joint 280 may permit the cover member 220 to be interchanged. For example, the cover member can be removed and replaced. This can provide a variety of options to the user for interchanging between a range of different-looking cover members. For example, FIG. 5 shows another exemplary embodiment of the insulated door lock assembly 500 having the base member 510, an upper member 520, a hinge joint 530 couple the upper member 520 to the base member 510. Herein the cover member shown in FIG. 2 is replaced by a cover member of a half rugby ball-shaped figurine. Similarly, a variety of options can be provided for the cover member to choose from, such as human head shape. In one exemplary embodiment, the base member can also include an O-ring 290 around a periphery of the wall, such as the cover member can be sealably interlocked to the base member.

A gasket along the periphery of the base member 210 can be provided such as the cover member 220 can sealably engage to the gasket. Handle 285 having two parts can be seen extending from the periphery of the cover member 220 and the base member 210, wherein the handle may allow lifting the cover member from the base member. Additionally, handles 285 can also be provided for locking the cover member to the base member as well to aid in lifting the cover member away from the base member.

In one exemplary embodiment, the base member 210 can be divided into two halves that can be joined through a fastening mechanism, such as a snap-fit mechanism. In one case, the two halves can be divided along an Axis "A" shown in FIG. 2 that is parallel to a faceplate of the base member and passing through the center. The two halves can be clamped around a cylinder of door lock and secured by the fastening mechanism. It is to be understood that features described for a particular embodiment, such as two halves forming the base member are applicable to all embodiments without departing from the scope of the present invention.

Figure 6:
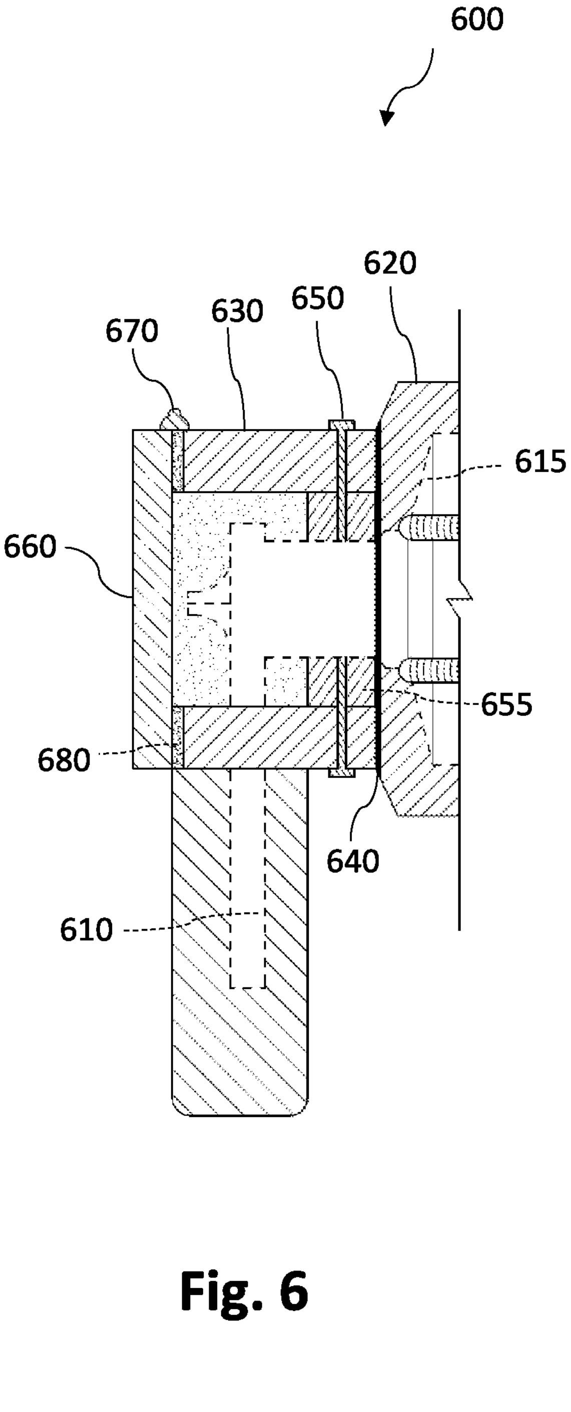
FIG. 6 is a sectional view of another exemplary embodiment of the insulated door lock assembly, according to the present invention.

Referring to FIG. 6 which shows another exemplary embodiment of the insulated door lock assembly 600 that can be adapted for locks having handles, such as doorknobs and levers. The door handle 610 with the escutcheon plate 615 is shown in the dotted line. The insulated door lock assembly 600 can include a base member 620 that can be coupled to the door using adhesive, fasteners, or magnetic tapes. FIG. 6 shows the base member 620 applied over the escutcheon plate 615. The insulated door lock assembly 600 can further include an intermediate member 630 that can be coupled to the base member through a swivel joint 640. The swivel joint 640 allows the intermediate member 630 to swivel against the fixed base member 620. The intermediate member can be adapted according to the shape of the door handle. For example, FIG. 6 shows the door handle in the form of a bar or lever which can be grasped and turned. The intermediate member can encase the door handle and can itself be grasped by hand for turning the intermediate member and thus the door handle. Similarly, the intermediate member can be adapted for the doorknobs. The empty inner volume of the intermediate member can be filled with insulation material. Two set screws 650 can also be seen to engage the door handle. Spacers 655 made of rubber, silicone, plastic, or like material can be used through which the set screws can be inserted, wherein the spacers can fill the gap between a wall of the intermediate member and the door handle. The intermediate member 630 can be open in front to provide access to the keyway, thumb turn, or like part of the door handle or door lock. The open front of the intermediate member can be covered by a cover member 660. The cover member can be pivotally coupled to the intermediate member through a hinge joint 670. The cover member 660 can be similar to the cover member shown in FIG. 2 and FIG. 5. Alternatively, the cover member can be opaque to which different indicia can be applied. Or different figurines can be carved on the cover member for aesthetic purposes. Gasket 680 can also be provided along a periphery of the open front of the intermediate member 630, such as the cover member 660 can be sealably closed. It is to be understood that hollow figurines, such as the half rugby balls or the human faces can be made from an insulative material or can be fully or partially filled with the insulation material.

In one exemplary embodiment, the cover member 660 can be made from weather-resistant and thermally insulative material. Alternatively, the cover member 660 can be hollow that can be filled with the insulative material. In one case, the periphery of the open front of the intermediate member 630 can be sloped, such as to increase the area of the cover member and changing the view angle of the cover member. The sloped cover member can have a larger surface area and can be easily visible to a person standing in front of the door. In one case, a light source can also be provided that can illuminate the interior of the intermediate member. An LED bulb powered by an in-house battery can be provided which can be coupled to the hinge joint as a switch to turn the lights on and off. Opening of the cover member can turn on the lights while closing the cover member can close the lights. In one case, a camera can be mounted in the insulated door lock assembly for security. Lights can be provided not only to illuminate the keyway but as door handle lights that can illuminate the immediate surroundings of the insulated door lock assembly. A solar panel can also be provided for harnessing solar energy, wherein the light can be powered by renewable energy. Door alarms and bells can also be embodied in the insulated door lock assembly. In one case, at least one indicium in the insulated door lock assembly can be an emergency exit sign. Alternatively, the outer and inner faceplates can provide space for advertisements. For example, when used in a commercial building, such as stores and restaurants, the outer and inner areas of the cover member including the inner and outer faceplates can be used for advertisement. The insulative door lock assembly can include lights for illuminating either one side of the door or both sides of the door. In one case, a counter can be provided in the insulative door lock assembly, wherein the counter can count the number of times the door is opened. The value of the counter can be visible through a display mounted in the cover member of the insulative door lock assembly. Additionally, a clock can also be provided in the cover member, wherein the clock can be powered by batteries also housed in the insulative door lock assembly. One or more features of the insulative door lock assembly can be controlled remotely through a computing device such as a smartphone. The insulative door lock assembly can include network circuitry for connecting to a network. The network can be wired or wireless. Examples of the network can include Wi-Fi, Bluetooth, and cellular network. A user can remotely turn on the lights in the insulative door lock assembly through an app installed in the smartphone and wirelessly connected to the insulative door lock assembly. The feed from the camera in the insulative door lock assembly can be broadcasted on the remote device. The cover member can include electronic displays, such as LCD and digital images/videos can be presented through the displays in the cover member. The displays can be provided on either the outer side of the cover member or both the inner and outer sides of the cover member. In one case, the insulative door lock assembly can also be provided with a room thermometer, wherein the measure room temperature can be displayed on a display mounted to an outer side of the cover member.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An insulated door lock assembly comprising:

a base member, the base member comprises a faceplate and a wall perpendicularly extending from a periphery of the faceplate, the faceplate has a central aperture, the wall has a proximal end and a distal end, wherein the base member is configured to couple to a door lock and the central aperture of the faceplate is dimensioned to receive a cylinder of the door lock, the base member has an open front along the proximal end of the wall of the base member; and a cover member coupled to the base member through a hinge joint, wherein the cover member is configured to cover the open front of the base member, wherein the base member and the cover member are filled with insulation material, wherein the cover member comprises:

an upstanding wall that has a proximal end and a distal end;

an outer faceplate, wherein the upstanding wall at the proximal end extends from a periphery of the outer faceplate, the outer faceplate and the upstanding wall defines an inner volume of the cover member, the outer faceplate is made of a first Plexiglass and a first indicium is applied to an inner surface of the outer faceplate that is visible through the first Plexiglass, and an inner faceplate that is parallel to the outer faceplate and extends along the distal end of the upstanding wall of the cover member, wherein the hinge joint is coupled to the distal end of the upstanding wall of the cover member and the proximal end of the wall of the base member.

2. The insulated door lock assembly as claimed in claim 1, wherein the outer faceplate of the cover member is configured as a hollow figurine, wherein the hollow figurine is fully or partially filled with the insulation material.

3. The insulated door lock assembly as claimed in claim 2, wherein the hollow figurine resembles a half rugby ball.

4. The insulated door lock assembly as claimed in claim 1, wherein the inner faceplate is made of a second Plexiglass and a second indicium is applied to an inner surface of the inner faceplate that is visible through the second Plexiglass.

5. The insulated door lock assembly as claimed in claim 1, wherein the wall of the base member defines an inner volume of the base member, the faceplate of the base member divides the inner volume of the base member into a front inner volume and a rear inner volume, an insulation pad with an aperture in center fits into the rear inner volume of the base member, the aperture of the insulation pad concentric with the central aperture in the faceplate of the base member, the front inner volume of the base member configured to encase a part of the door lock.

6. The insulated door lock assembly as claimed in claim 5, wherein the part of the door lock is a keyway or a thumb turn.

7. The insulated door lock assembly as claimed in claim 1, wherein the base member comprised of a first-half part and a second-half part, the base member divided into the first-half part and the second-half part along an axis parallel to the faceplate of the base member and passing through a center of the central aperture in the faceplate, the first-half part configured to interlock with the second-half part.

8. An insulated door lock assembly comprising:

a base member, the base member comprises a faceplate and a wall perpendicularly extending from a periphery of the faceplate, the faceplate has a central aperture, the wall has a proximal end and a distal end, wherein the base member is configured to couple to a door lock and the central aperture of the faceplate is dimensioned to receive a cylinder of the door lock, the base member has an open front along the proximal end of the wall of the base member, wherein the wall of the base member defines an inner volume of the base member, the faceplate of the base member divides the inner volume of the base member into a front inner volume and a rear inner volume, an insulation pad with an aperture in center fits into the rear inner volume of the base member, the aperture of the insulation pad concentric with the central aperture in the faceplate of the base member, the front inner volume of the base member configured to encase a part of the door lock; and a cover member coupled to the base member through a hinge joint, wherein the cover member is configured to cover the open front of the base member, wherein the base member and the cover member are filled with insulation material.

9. An insulated door lock assembly comprising:

a base member, the base member comprises a faceplate and a wall perpendicularly extending from a periphery of the faceplate, the faceplate has a central aperture, the wall has a proximal end and a distal end, wherein the base member is configured to couple to a door lock and the central aperture of the faceplate is dimensioned to receive a cylinder of the door lock, the base member has an open front along the proximal end of the wall of the base member, the base member comprised of a first-half part and a second-half part, the base member divided into the first-half part and the second-half part along an axis parallel to the faceplate of the base member and passing through a center of the central aperture in the faceplate, the first-half part configured to interlock with the second-half part; and a cover member coupled to the base member through a hinge joint, wherein the cover member is configured to cover the open front of the base member, wherein the base member and the cover member are filled with insulation material.

* * * * *